2,783,738
Patented Mar. 5, 1957

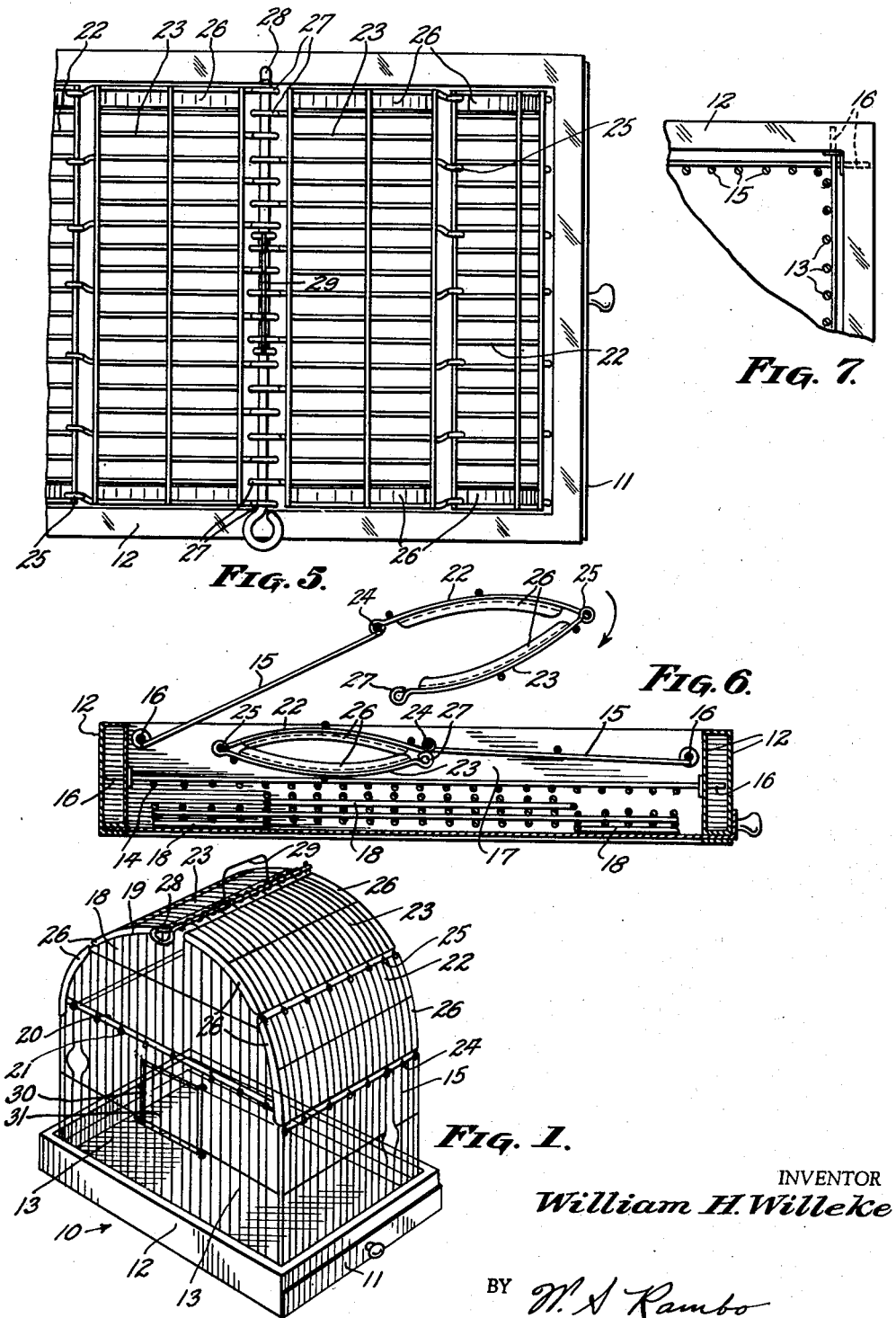

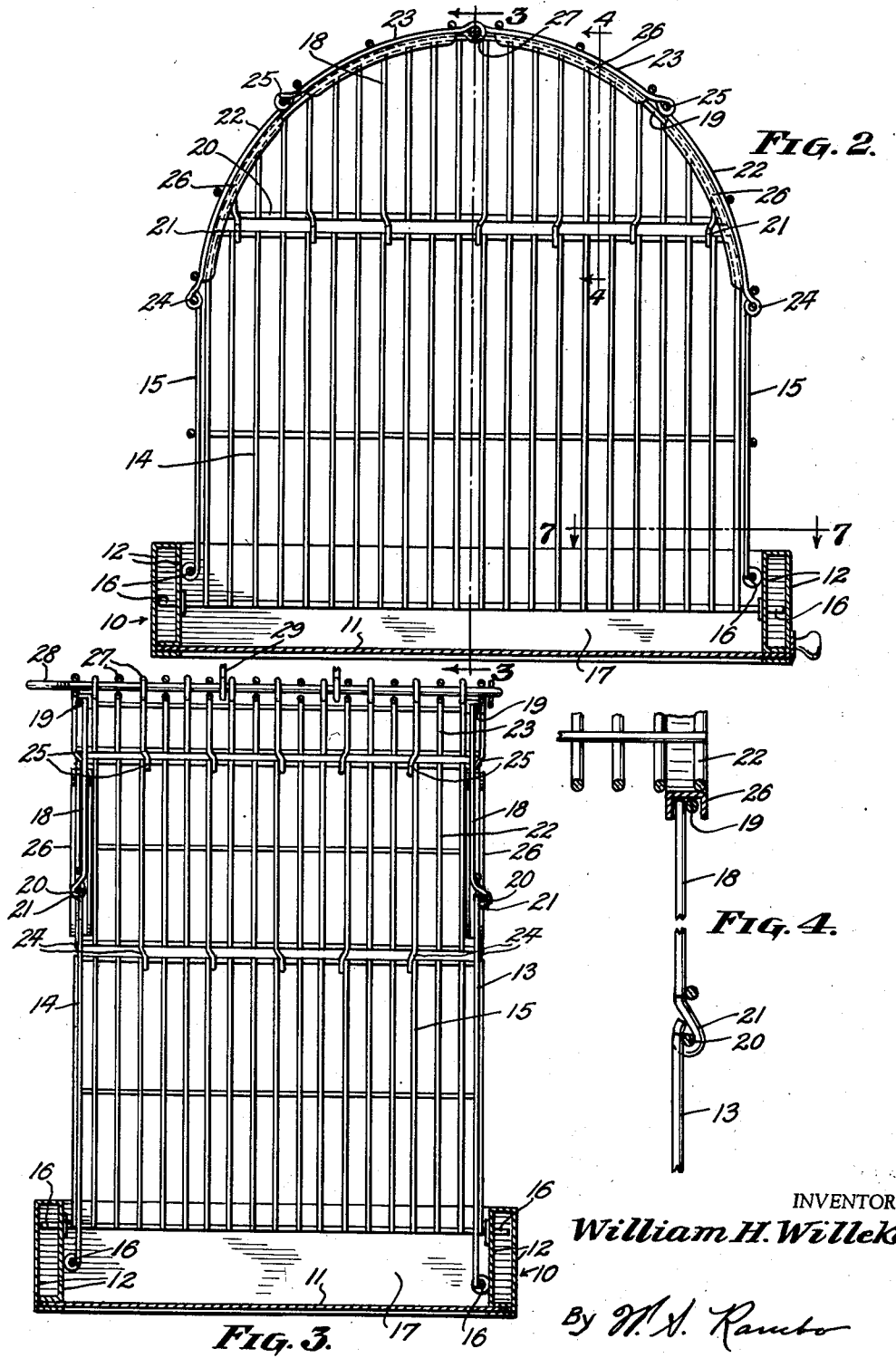

2,783,738

COLLAPSIBLE BIRD CAGE

William H. Willeke, Lancaster, Ohio

Application May 9, 1956, Serial No. 583,699

5 Claims. (Cl. 119—17)

This invention relates to an improved collapsible bird cage, the same having its general object to provide a bird cage wherein reticular front, back, side and top walls or panels thereof are joined for swinging movement with an associated base and with each other, so that when the cage is undergoing shipment, or when not in active use, the said walls or panels may be folded upon each other and upon the base in a compact space-saving manner.

Another object is to provide a structurally improved bird cage of the character indicated which when assembled and set up for use is so formed as to securely retain the wall or panel sections thereof in their required fixed, cage-forming, relative order and secure against relative displacement or loss of position.

With these and other ends in view which will readily appear as the nature of the invention is better understood, the same consists in the improved construction and novel arrangement and combination of parts which will be hereinafter fully described and pointed out in the appended claims.

In the accompanying drawing there has been illustrated a simple and preferred form of the invention, it being understood, however, that no limitation is necessarily made to the precise structural details therein exhibited, but that changes, alterations and modifications within the scope of the claims may be resorted to when desired.

In the drawing:

Fig. 1 is a perspective view of a collapsible bird cage formed in accordance with the present invention;

Fig. 2 is an enlarged vertical longitudinal sectional view taken through the cage;

Fig. 3 is an enlarged vertical transverse sectional view on the line 3—3 of Fig. 2;

Fig. 4 is an enlarged detail sectional view taken on the line 4—4 of Fig. 2;

Fig. 5 is an enlarged top plan view of the cage;

Fig. 6 is an enlarged vertical longitudinal sectional view disclosing the swinging panel sections of the cage in their collapsed or folded condition on the base of the cage;

Fig. 7 is an enlarged detail horizontal sectional view on the line 7—7 of Fig. 2.

Corresponding parts in the several figures of the drawing are denoted by like characters of reference.

As shown, the cage of the present invention comprises an imperforate base 10 of rectangular configuration, having a horizontally disposed slidably removable bottom wall 11, spaced upstanding marginal walls 12 and an open top. In connection with this base, the cage includes a plurality of walls or panels composed of spaced, intersecting wires or rods rigidly united with each other in a manner common to bird cage construction. These walls or panels comprise generally rectangular front, back and side members which have been indicated, respectively, by the numerals 13, 14 and 15. The lower edges of these walls or panel members are pivotally attached as at 16 to the upstanding walls 12 of the base 10, so that when the cage is to be collapsed, the said wall or panel members will be enabled to swing about their horizontally disposed pivotal mountings 16 from upright, active positions of use to lowered inactive positions in which they are disposed in substantially horizontal, relatively superposed order, resting on the bottom 11 of the base and within the confines of the walls 12 for disposal in a receiving chamber 17 formed for their reception and protection by the walls of the base.

The front and back panel members 13 and 14 carry extension panel members 18, each having an arcuately curved upper edge 19 and a straight horizontally extending lower edge 20, the members 18 being composed of spaced, intersecting and relatively united wires or rods in the same manner as the panel members 13, 14 and 15. The lower edges 20 of the members 18 are pivotally attached as at 21 to the adjacent upper edge portions of the panel members 13 and 14, so that when the cage is collapsed, the same may be swung back to flatly engage in a parallel manner the members 13 and 14 and lie within the margins thereof. When in their active, extended positions, the extension members 18 occupy the vertical planes of the panel members 13 and 14 to which they are pivotally attached, forming foldable continuations of said front and back panel members.

In forming the top of the cage, each side panel member 15 carries lower and upper arcuately curved, recticular panel sections 22 and 23, respectively, these top-forming panel sections possessing approximately the same curvature as the arcuate edges 19 of the extension members 18 with which they have marginal, interlocking engagement. The lower marginal portion of each panel section 22 is pivotally joined at 24 with the upper portions of the side panel member 15 carrying the same. Likewise, the upper marginal edge region of each lower panel section 22 is pivotally united at 25 with the adjacent lower edge region of the upper panel section 23 to provide a flexible union between the same. This construction enables the panel sections, when the side panel members 15 are moved to a cage-collapsing position, to be folded over the members 15 and over one another to utilize but a minimum of space in the base chamber 17.

In order to securely hold these panel members and sections in stable interlocked relationship when in cage-forming order, the arcuate marginal edges of the top-forming panel sections 22 and 23 at the front and back of the cage carry downwardly facing channel members 26 which receive and rest upon the arcuate edge portions 19 of the extension panel members 18, thereby securely joining the members 18 with the sections 22 and 23 and holding the same against relative movement. Then, in order to fasten the members 18 and sections 22 and 23 in such positions of assembly, the wires or rods composing the sections 23, at the top of the cage, terminate in eyes 27 which are disposed in interfitting aligned order transversely of the cage. A removable securing pin 28 is passed through the aligned eyes in a manner holding the sections 23 together and preventing their separation.

When the pin is thus positioned all the panel members and the flexibly associated sections carried thereby are firmly united in their operative cage-forming order and retained therein until the pin 28 is withdrawn from the eyes 27. When so withdrawn, the panel members and sections may then be moved by swinging movement about their pivotal mountings to collapsed positions within the base chambers. The walls 12 of the base 10 are strong and rigid, so that a plurality of such collapsed cage assemblies may be placed or stacked on another in aligned order for storage or shipment purposes without danger of bending or structurally injuring the light wire panel members and sections. A handle 29 is positioned on the pin 28 at the time the latter is inserted in the eyes 27 and from which handle the cage may be suspended when in use. Also, the front panel member 13 is formed with an opening 30 providing access to the interior of the cage, the opening being normally closed by a swinging door 31 carried by and forming a component part of the front panel member.

I claim:

1. Collapsible cage construction comprising: a rectangular base having imperforate bottom, upstanding front, back and side walls and an open top defining a panel-receiving chamber; normally vertically disposed, front, back and side panels having their lower portions disposed in said chamber; means pivotally joining the lower portions of said panels with said base to provide for swinging movement on the part of said panels; upper and lower, arcuate, top-forming panel sections pivotally joined with each other and with the upper portions of said side panels; extension panels of segmental form pivotally carried by the upper portions of the front and back panels and constituting continuations thereof; channel members rigidly carried by arcaute front and back edges of said top-forming sections and in which segmental edge portions of said extension panels are received to support the top-forming sections in their erected positions and to hold the extension panels in upright positions in the vertical plane of the front and back panels, the upper of said top-forming sections when the cage is set up for use having adjacent edges formed with transversely aligned eyes; and pin means removably received in said eyes to hold said panels and sections positively in their erected cage-forming positions, said panels and sections when the cage is collapsed being disposed in folded superposed order within the confines of the chamber provided by the base.

2. Collapsible bird cage construction comprising a horizontal base formed with an open-topped chamber; primary front, back and side panel members of wire formation disposed in vertical planes when actively positioned in cage-forming order; means pivotally uniting the lower portions of each of said panel members with said base and within the confines of the chamber therein, said means providing for the swinging of said panel member from their vertical active position to inactive positions of collapse in which the members are disposed flatly and horizontally on said base and on each other within said chamber; wire extension panel members pivotally carried by the upper portion of said primary panel members for forming the top of the cage when the latter is set up for use; interfitting channel means carried by the adjoining marginal edges of said extension panel members for retaining the latter in their active positions of relative registry; and removable means positionable transversely of the cage in aligned openings formed in adjoining meeting edges of the extension panel members connected with the primary side panel mmebers and serving when so positioned to hold fixedly all of said members against relative movement toward positions of collapse.

3. Collapsible bird cage construction as defined in claim 2, and wherein said removable means support a detachable handle member.

4. Collapsible cage construction as defined in claim 1, and wherein said front panel is formed with a door-closed access opening.

5. Collapsible bird cage construction comprising an imperforate horizontal base having upstanding marginal walls defining a relatively shallow open-topped chamber; primary front, back and side panel members of open, spaced wire formation; means pivotally uniting the lower portions of said panel members with said base, said means providing for swinging movement of said panel members between upright active positions of use and lowered inactive positions of collapse in which the same are disposed substantially horizontally within the chamber of said base; extension panel members pivotally united with the upper portions of said primary panel members for disposal above the same in forming a dome-shaped top on the cage when said members are actively positioned; flanged means carried by front and back side edges of the extension panel members connected with said primary side members, said flanged means resting upon and having interfitting engagement with adjoining marginal edges of the extension panel members carried by said primary front and back members; and removable pin means disposed transversely of the assembled cage in aligned openings therefor formed in adjoining edge portions of the extension panel members connected with the primary side members and serving when so positioned to hold fixedly all of said panel members in their active positions of cage formation.

References Cited in the file of this patent

UNITED STATES PATENTS

| | | |
|---|---|---|
| 1,712,185 | Whitcomb | May 7, 1929 |
| 2,529,893 | Albert | Nov. 14, 1950 |
| 2,552,007 | Griffith | May 8, 1951 |